United States Patent
Zhou et al.

(10) Patent No.: US 11,659,537 B2
(45) Date of Patent: May 23, 2023

(54) METHOD AND DEVICE FOR ALLOCATING RESOURCES, USER EQUIPMENT, BASE STATION AND READABLE STORAGE MEDIUM

(71) Applicant: SPREADTRUM COMMUNICATIONS (SHANGHAI) CO., LTD., Zhangjiang Shanghai (CN)

(72) Inventors: Huayu Zhou, Zhangjiang Shangahi (CN); Yanan Jia, Zhangjiang Shanghai (CN); Shaofei Wang, Zhangjiang Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/703,279

(22) Filed: Mar. 24, 2022

(65) Prior Publication Data
US 2022/0225331 A1    Jul. 14, 2022

Related U.S. Application Data (63) Continuation of application No. 16/842,045, filed on Apr. 7, 2020, now Pat. No. 11,317,408, which is a
(Continued)

(30) Foreign Application Priority Data

Aug. 11, 2017    (CN) .......................... 201710685505.X (51) Int. Cl.
*H04W 72/04* (2023.01)
*H04W 48/10* (2009.01)
(Continued)

(52) U.S. Cl.
CPC ....... *H04W 72/0453* (2013.01); *H04L 5/0044* (2013.01); *H04L 5/0053* (2013.01);
(Continued)

(58) Field of Classification Search
CPC . H04W 72/0453; H04W 48/10; H04W 48/12; H04W 56/001; H04W 72/042;
(Continued)

(56) References Cited

U.S. PATENT DOCUMENTS

| | | | | |
|---|---|---|---|---|
| 2011/0201341 A1* | 8/2011 | Choudhury | ....... | H04W 72/0426 455/450 |
| 2013/0176952 A1* | 7/2013 | Shin | ...................... | H04L 5/0098 370/329 |

(Continued)

FOREIGN PATENT DOCUMENTS

| | | |
|---|---|---|
| CN | 102868423 A | 1/2013 |
| CN | 103152831 A | 6/2013 |

(Continued)

OTHER PUBLICATIONS

CNIPA First Office Action for corresponding CN Application No. 201710685505.X; dated Jul. 9, 2021.
(Continued)

*Primary Examiner* — Kyaw Z Soe
(74) *Attorney, Agent, or Firm* — Cantor Colburn LLP (57) ABSTRACT

Method and device for allocating resources, UE, base station and readable storage mediums are provided. The method includes: after initial cell selection or cell reselection is completed in an idle state, acquiring position information of a first type of RB; acquiring reference point offset indication information from a base station, wherein the reference point offset indication information includes a frequency domain offset N of a reference point relative to a specified RB which is one of the first type of RB; calculating a frequency domain
(Continued)

position of the reference point based on the position information of the first type of RB and the reference point offset indication information; when receiving scheduling information from the base station, determining an RB for receiving PDSCH based on the frequency domain position of the reference point and resource allocation information included in the scheduling information. Resource allocation efficiency in idle state is improved.

20 Claims, 3 Drawing Sheets

Related U.S. Application Data continuation of application No. 16/059,451, filed on Aug. 9, 2018, now Pat. No. 10,652,891.

(51) Int. Cl.
*H04W 56/00* (2009.01)
*H04L 5/00* (2006.01)
*H04W 48/12* (2009.01)
*H04W 72/12* (2023.01)
*H04W 72/0453* (2023.01)

(52) U.S. Cl.
CPC ........... *H04L 5/0094* (2013.01); *H04W 48/10* (2013.01); *H04W 48/12* (2013.01); *H04W 56/001* (2013.01); *H04W 72/042* (2013.01); *H04W 72/1289* (2013.01)

(58) Field of Classification Search
CPC ......... H04W 72/1289; H04W 72/1278; H04W 72/14; H04L 5/0044; H04L 5/0053; H04L 5/0094; H04L 5/0048; H04L 5/0092; H04L 5/0098

See application file for complete search history.

(56) References Cited

U.S. PATENT DOCUMENTS

| | | | |
|---|---|---|---|
| 2014/0092865 A1* | 4/2014 | Heo | H04B 5/00 370/331 |
| 2015/0016348 A1 | 1/2015 | Cimpu et al. | |
| 2016/0165411 A1 | 6/2016 | Lee et al. | |
| 2016/0269953 A1 | 9/2016 | Jung et al. | |
| 2016/0338056 A1 | 11/2016 | Xue et al. | |
| 2019/0053239 A1 | 2/2019 | Zhou | |
| 2020/0236679 A1 | 7/2020 | Zhou | |

FOREIGN PATENT DOCUMENTS

| | | |
|---|---|---|
| CN | 105453688 A | 3/2016 |
| CN | 106061572 A | 10/2016 |

OTHER PUBLICATIONS

Ericsson, "CR to RNSAP Rapporteur Update", 3rd Generation Partnership Project, 3GPP TSG-RAN WG3 Meeting #86, (Nov. 17-21, 2014(, R3-143067; 1 page.
USPTO Non-Final Office Action for related U.S. Appl. No. 16/069,451 dated Sep. 16, 2019.
USPTO Notice of Allowance for related U.S. Appl. No. 16/059,451, dated Jan. 9, 2020.
USPTO Non-Final Office Action for related U.S. Appl. No. 16/842,045, dated Aug. 19, 2021.

* cited by examiner

METHOD AND DEVICE FOR ALLOCATING RESOURCES, USER EQUIPMENT, BASE STATION AND READABLE STORAGE MEDIUM

CROSS-REFERENCE TO RELATED APPLICATIONS

The present application is a continuation application of the U.S. patent application Ser. No. 16/842,045 filed on Apr. 7, 2020, which is a Continuation Application of the U.S. patent application Ser. No. 16/059,451 filed on Aug. 9, 2018, the entire contents of which are incorporated herein by reference. The Ser. No. 16/059,451 application claimed the benefit of the date of the earlier filed Chinese Patent Application No. 201710685505.X, filed on Aug. 11, 2017, priority to which is also claimed herein, and the contents of which are also incorporated by reference herein.

TECHNICAL FIELD

The present disclosure generally relates to communication technology field, and more particularly, to method and device for allocating resources, a user equipment, a base station and readable storage mediums.

BACKGROUND

In a 5G system, a base station transmits a synchronization signal block on an initial access sub-band in a large bandwidth. For example, a synchronization signal block is transmitted on a sub-band with a bandwith of 5 MHz within a system bandwidth of 100 MHz. A first Control Resource Set (CORESET) is transmitted on a first sub-band of the large bandwidth, and a second CORESET is transmitted on a second sub-band of the large bandwidth. By a Physical Downlink Control Channel (PDCCH) in the first CORESET or the second CORESET, the base station schedules a User Equipment (UE) to receive common control messages on an indicated Physical Downlink Shared channel (PDSCH) to acquire Remaining Minimum System Information (RMSI) or paging messages.

Scheduling information in the PDCCH includes information of resource allocation, so as to inform the UE on which Resource Blocks (RBs) to receive the PDSCH.

However, in an idle state, the base station may not need to indicate a system bandwidth to the UE, thus the UE cannot know the system bandwidth of the base station. The base station cannot know bandwidth capability of the UE in the idle state as well as different UEs have different bandwidth capabilities. As the system bandwidth of a single carrier in a 5G system increases significantly, in the idle state, existing resource allocation methods cannot adapt to the 5G system currently due to low resource allocation efficiency.

SUMMARY

By embodiments of the present disclosure, resource allocation efficiency of a system in an idle state may be improved.

In an embodiment of the present disclosure, a method for allocating resources is provided, including: after initial cell selection or cell reselection is completed in an idle state, acquiring position information of a first type of resource block; acquiring reference point offset indication information from a base station, wherein the reference point offset indication information includes a frequency domain offset N of a reference point relative to a specified resource block, the specified resource block being one of the first type of resource block, and N being an integer; calculating a frequency domain position of the reference point based on the position information of the first type of resource block and the reference point offset indication information; and when receiving scheduling information from the base station, determining a resource block for receiving a physical downlink shared channel based on the frequency domain position of the reference point and resource allocation information included in the scheduling information.

Optionally, the frequency domain offset N is indicated by a corresponding index S, and a bit number of the index S is smaller than or equal to a bit number of the frequency domain offset N.

Optionally, the reference point corresponds to a start resource block, and determining a resource block for receiving a physical downlink shared channel based on the frequency domain position of the reference point and resource allocation information included in the scheduling information includes: determining the resource block for receiving the physical downlink shared channel based on the resource allocation information included in the scheduling information by taking the start resource block corresponding to the reference point as a start resource block for counting resource blocks.

Optionally, the first type of resource block belongs to a synchronization signal block or a control resource set.

Optionally, when the first type of resource block belongs to a synchronization signal block, the specified resource block is a specified resource block in a synchronization signal or in a physical broadcast channel.

Optionally, when the specified resource block is a specified resource block in the synchronization signal block, the specified resource block is one of the following resource blocks: a resource block with a minimum index in the synchronization signal; a resource block with a maximum index in the synchronization signal; or a resource block with any index between the minimum index and the maximum index in the synchronization signal.

Optionally, when the specified resource block is a specified resource block in the physical broadcast channel, the specified resource block is one of the following resource blocks: a resource block with a minimum index in the physical broadcast channel; a resource block with a maximum index in the physical broadcast channel; or a resource block with any index between the minimum index and the maximum index in the physical broadcast channel.

Optionally, when the first type of resource block belongs to a synchronization signal block, the reference point offset indication information is acquired from the base station based on one of the following information: remaining minimum system information; a master information block in a physical broadcast channel; or downlink control information.

Optionally, when the first type of resource block belongs to a control resource set, the position information of the first type of resource block is acquired based on one of the following information: remaining minimum system information; or a master information block in a physical broadcast channel.

Optionally, when the first type of resource block belongs to a control resource set, the reference point offset indication information is acquired from the base station based on one of the following information: remaining minimum system information; or a master information block in a physical broadcast channel.

Optionally, when the specified resource block is a resource block in the control resource set, the specified resource block is one of the following resource blocks: a resource block with a minimum index in the control resource set; a resource block with a maximum index in the control resource set; or a resource block with any index between the minimum index and the maximum index in the control resource set.

Optionally, the maximum index for the resource block is a maximum index for the resource block under a minimum bandwidth.

Optionally, the minimum bandwidth is a smaller one between a system bandwidth and a minimum user equipment bandwidth.

In an embodiment of the present disclosure, a method for allocating resources is provided, including: in an idle state, after it is detected that a UE completes initial cell selection or cell reselection, transmitting to the UE position information of a first type of resource block; transmitting to the UE reference point offset indication information, so that the UE calculates a frequency domain position of a reference point based on the position information of the first type of resource block and the reference point offset indication information, wherein the reference point offset indication information includes a frequency domain offset N of the reference point relative to a specified resource block, the specified resource block being one of the first type of resource block, and N being an integer; and transmitting to the UE scheduling information which includes resource allocation information, so that the UE determines a resource block for receiving a physical downlink shared channel based on the frequency domain position of the reference point and the resource allocation information included in the scheduling information.

Optionally, the frequency domain offset N is indicated by a corresponding index S, and a bit number of the index S is smaller than or equal to a bit number of the frequency domain offset N.

Optionally, the reference point is one selected from available reference points according to a predetermined rule.

Optionally, the reference point corresponds to a start resource block, and determining a resource block for receiving a physical downlink shared channel based on the frequency domain position of the reference point and resource allocation information included in the scheduling information includes: determining the resource block for receiving the physical downlink shared channel based on the resource allocation information included in the scheduling information by taking the start resource block corresponding to the reference point as a start resource block for counting resource blocks.

Optionally, the first type of resource block belongs to a synchronization signal block or a control resource set.

Optionally, when the first type of resource block belongs to a synchronization signal block, the specified resource block is a specified resource block in a synchronization signal or in a physical broadcast channel.

Optionally, when the specified resource block is a specified resource block in the synchronization signal block, the specified resource block is one of the following resource blocks: a resource block with a minimum index in the synchronization signal; a resource block with a maximum index in the synchronization signal; or a resource block with any index between the minimum index and the maximum index in the synchronization signal.

Optionally, when the specified resource block is a specified resource block in the physical broadcast channel, the specified resource block is one of the following resource blocks: a resource block with a minimum index in the physical broadcast channel; a resource block with a maximum index in the physical broadcast channel; or a resource block with any index between the minimum index and the maximum index in the physical broadcast channel.

Optionally, when the first type of resource block belongs to a synchronization signal block, the reference point offset indication information is transmitted to the UE based on one of the following information: remaining minimum system information; a master information block in a physical broadcast channel; or downlink control information.

Optionally, when the first type of resource block belongs to a control resource set, the position information of the first type of resource block is transmitted to the UE based on one of the following information: remaining minimum system information; or a master information block in a physical broadcast channel.

Optionally, when the first type of resource block belongs to a control resource set, the reference point offset indication information is transmitted to the UE based on one of the following information: remaining minimum system information; or a master information block in a physical broadcast channel.

Optionally, when the specified resource block is a resource block in the control resource set, the specified resource block is one of the following resource blocks: a resource block with a minimum index in the control resource set; a resource block with a maximum index in the control resource set; or a resource block with any index between the minimum index and the maximum index in the control resource set.

Optionally, the maximum index for the resource block is a maximum index for the resource block under a minimum bandwidth.

Optionally, the minimum bandwidth is a smaller one between a system bandwidth and a minimum user equipment bandwidth.

In an embodiment of the present disclosure, a UE is provided, including a first acquiring circuitry, a second acquiring circuitry, a calculating circuitry and a determining circuitry, wherein the first acquiring circuitry is configured to: after initial cell selection or cell reselection is completed in an idle state, acquire position information of a first type of resource block; the second acquiring circuitry is configured to acquire reference point offset indication information from a base station, wherein the reference point offset indication information includes a frequency domain offset N of a reference point relative to a specified resource block, the specified resource block being one of the first type of resource block, and N being an integer; the calculating circuitry is configured to calculate a frequency domain position of the reference point based on the position information of the first type of resource block and the reference point offset indication information; and the determining circuitry is configured to: when scheduling information is received from the base station, determine a resource block for receiving a physical downlink shared channel based on the frequency domain position of the reference point and resource allocation information included in the scheduling information.

Optionally, the frequency domain offset N is indicated by a corresponding index S, and a bit number of the index S is smaller than or equal to a bit number of the frequency domain offset N.

Optionally, the reference point corresponds to a start resource block, and the determining circuitry is configured to: determine the resource block for receiving the physical downlink shared channel based on the resource allocation information included in the scheduling information by taking the start resource block corresponding to the reference point as a start resource block for counting resource blocks.

Optionally, the first type of resource block belongs to a synchronization signal block or a control resource set.

Optionally, when the first type of resource block belongs to a synchronization signal block, the specified resource block is a specified resource block in a synchronization signal or in a physical broadcast channel.

Optionally, when the specified resource block is a specified resource block in the synchronization signal block, the specified resource block is one of the following resource blocks: a resource block with a minimum index in the synchronization signal; a resource block with a maximum index in the synchronization signal; or a resource block with any index between the minimum index and the maximum index in the synchronization signal.

Optionally, when the specified resource block is a specified resource block in the physical broadcast channel, the specified resource block is one of the following resource blocks: a resource block with a minimum index in the physical broadcast channel; a resource block with a maximum index in the physical broadcast channel; or a resource block with any index between the minimum index and the maximum index in the physical broadcast channel.

Optionally, the second acquiring circuitry is configured to: when the first type of resource block belongs to a synchronization signal block, acquire the reference point offset indication information from the base station based on one of the following information: remaining minimum system information; a master information block in a physical broadcast channel; or downlink control information.

Optionally, the first acquiring circuitry is configured to: when the first type of resource block belongs to a control resource set, acquire the position information of the first type of resource block based on one of the following information: remaining minimum system information; or a master information block in a physical broadcast channel.

Optionally, the second acquiring circuitry is configured to: when the first type of resource block belongs to a control resource set, acquire the reference point offset indication information from the base station based on one of the following information: remaining minimum system information; or a master information block in a physical broadcast channel.

Optionally, when the specified resource block is a resource block in the control resource set, the specified resource block is one of the following resource blocks: a resource block with a minimum index in the control resource set; a resource block with a maximum index in the control resource set; or a resource block with any index between the minimum index and the maximum index in the control resource set.

Optionally, the maximum index for the resource block is a maximum index for the resource block under a minimum bandwidth.

Optionally, the minimum bandwidth is a smaller one between a system bandwidth and a minimum user equipment bandwidth.

In an embodiment of the present disclosure, a base station is provided, including a first transmitting circuitry, a second transmitting circuitry and a third transmitting circuitry, wherein the first transmitting circuitry is configured to: in an idle state, after it is detected that a UE completes initial cell selection or cell reselection, transmit to the UE position information of a first type of resource block; the second transmitting circuitry is configured to transmit to the UE reference point offset indication information, so that the UE calculates a frequency domain position of a reference point based on the position information of the first type of resource block and the reference point offset indication information, wherein the reference point offset indication information includes a frequency domain offset N of the reference point relative to a specified resource block, the specified resource block being one of the first type of resource block, and N being an integer; and the third transmitting circuitry is configured to transmit to the UE scheduling information which includes resource allocation information, so that the UE determines a resource block for receiving a physical downlink shared channel based on the frequency domain position of the reference point and the resource allocation information included in the scheduling information.

Optionally, the frequency domain offset N is indicated by a corresponding index S, and a bit number of the index S is smaller than or equal to a bit number of the frequency domain offset N.

Optionally, the second transmitting circuitry includes a selecting sub-circuitry configured to select one point from available reference points according to a predetermined rule as the reference point.

Optionally, the reference point corresponds to a start resource block which is taken as a start resource block for counting resource blocks when the UE determines the resource block for receiving the physical downlink shared channel based on the resource allocation information included in the scheduling information.

Optionally, the first type of resource block belongs to a synchronization signal block or a control resource set.

Optionally, when the first type of resource block belongs to a synchronization signal block, the specified resource block is a specified resource block in a synchronization signal or in a physical broadcast channel.

Optionally, when the specified resource block is a specified resource block in the synchronization signal block, the specified resource block is one of the following resource blocks: a resource block with a minimum index in the synchronization signal; a resource block with a maximum index in the synchronization signal; or a resource block with any index between the minimum index and the maximum index in the synchronization signal.

Optionally, when the specified resource block is a specified resource block in the physical broadcast channel, the specified resource block is one of the following resource blocks: a resource block with a minimum index in the physical broadcast channel; a resource block with a maximum index in the physical broadcast channel; or a resource block with any index between the minimum index and the maximum index in the physical broadcast channel.

Optionally, the second transmitting circuitry is configured to: when the first type of resource block belongs to a synchronization signal block, transmit to the UE the reference point offset indication information based on one of the following information: remaining minimum system information; a master information block in a physical broadcast channel; or downlink control information.

Optionally, the first transmitting circuitry is configured to: when the first type of resource block belongs to a control resource set, transmit to the UE the position information of the first type of resource block based on one of the following information: remaining minimum system information; or a master information block in a physical broadcast channel.

Optionally, the second transmitting circuitry is configured to: when the first type of resource block belongs to a control resource set, transmit to the UE the reference point offset indication information based on one of the following information: remaining minimum system information; or a master information block in a physical broadcast channel.

Optionally, when the specified resource block is a resource block in the control resource set, the specified resource block is one of the following resource blocks: a resource block with a minimum index in the control resource set; a resource block with a maximum index in the control resource set; or a resource block with any index between the minimum index and the maximum index in the control resource set.

Optionally, the maximum index for the resource block is a maximum index for the resource block under a minimum bandwidth.

Optionally, the minimum bandwidth is a smaller one between a system bandwidth and a minimum user equipment bandwidth.

In an embodiment of the present disclosure, a computer readable storage medium which is applied in a UE and has computer instructions stored therein is provided, wherein once the computer instructions are executed, the above method for allocating resources is performed.

In an embodiment of the present disclosure, a computer readable storage medium which is applied in a base station and has computer instructions stored therein is provided, wherein once the computer instructions are executed, the above method for allocating resources is performed.

In an embodiment of the present disclosure, a UE is provided, including a memory and a processor, wherein the memory has computer instructions stored therein, and once executing the computer instructions, the processor performs the above method for allocating resources.

In an embodiment of the present disclosure, a base station is provided, including a memory and a processor, wherein the memory has computer instructions stored therein, and once executing the computer instructions, the processor performs the above method for allocating resources.

Embodiments of the present disclosure may provide following advantages. Reference point offset indication information is obtained from the base station, where the reference point offset indication information includes a frequency domain offset N of a reference point relative to a specified resource block. A frequency domain position of the reference point is calculated based on position information of the first type of resource block and the reference point offset indication information. The UE can quickly determine a resource block for receiving the physical downlink shared channel based on the frequency domain position of the reference point and resource allocation information included in the scheduling information. In this way, resource allocation efficiency of a system in the idle state may be improved.

Further, the frequency domain offset N is indicated by a corresponding index S, and a bit number of the index S is smaller than or equal to a bit number of the frequency domain offset N. Therefore, when there are many resource blocks, the number of bits occupied by the frequency domain offset may be reduced, so that signaling overhead in a resource allocation process may be saved.

Further, the first type of resource block belongs to the control resource set. As the CORESET and the PDSCH use a same sub-band during transmission, during the determination of a resource block for receiving the PDSCH, the offset of the resource block for receiving the PDSCH relative to the reference point is relatively small. Therefore, signaling overhead may be further saved.

DETAILED DESCRIPTION

As described in the background, in an idle state, the base station may not need to indicate a system bandwidth to the UE, thus the UE cannot know the system bandwidth of the base station. The base station cannot know bandwidth capability of the UE in the idle state as well as different UEs have different bandwidth capabilities. As the system bandwidth of a single carrier in a 5G system increases significantly, in the idle state, existing resource allocation methods cannot adapt to the 5G system currently due to low resource allocation efficiency.

In embodiments of the present disclosure, reference point offset indication information is obtained from a base station, where the reference point offset indication information includes a frequency domain offset N of a reference point relative to a specified resource block. A frequency domain position of the reference point is calculated based on position information of the first type of resource block and the reference point offset indication information. A UE can quickly determine a resource block for receiving the physical downlink shared channel based on the frequency domain position of the reference point and resource allocation information included in the scheduling information. In this way, resource allocation efficiency of a system in the idle state may be improved.

In order to clarify the object, solutions and advantages of embodiments of the present disclosure, embodiments of present disclosure will be described clearly in detail in conjunction with accompanying drawings.

Figure 1:
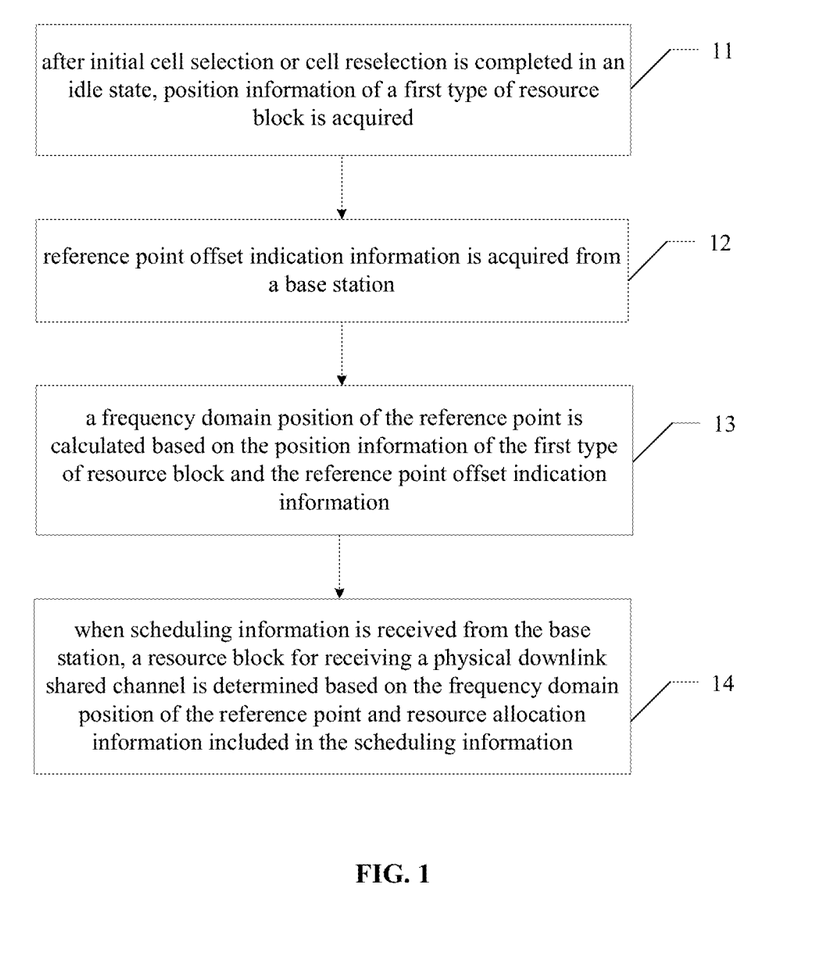
FIG. 1 schematically illustrates a flow chart of a method for allocating resources according to an embodiment.

FIG. 1 schematically illustrates a flow chart of a method for allocating resources according to an embodiment. Referring to FIG. 1, the method includes 11, 12, 13 and 14.

In 11, after initial cell selection or cell reselection is completed in an idle state, position information of a first type of resource block is acquired.

In some embodiments, the first type of resource block belongs to a synchronization signal block or a CORESET.

In some embodiments, the first type of resource block belongs to a synchronization signal block. When the UE completes initial cell selection or cell reselection, position information of all resource blocks in the synchronization signal block can be acquired.

In some embodiments, if the first type of resource block belongs to a CORESET, position information of all resource blocks in the CORESET may be acquired based on RMSI received from a base station or based on a Master Information Block (MIB) in a physical broadcast channel, i.e., acquiring frequency domain resource information of the CORESET from the RMSI or the MIB.

In 12, reference point offset indication information is acquired from a base station.

In some embodiments, the reference point offset indication information includes a frequency domain offset N of a reference point relative to a specified resource block, the specified resource block being one of the first type of resource block, and N being an integer.

In some embodiments, if there are a large number of resource blocks, to save signaling overhead, the base station may indicate the frequency domain offset N by using a corresponding index S, where the number of bits of the index S is smaller than or equal to the number of bits of the frequency domain offset N. The base station may select one point from available reference points according to a predetermined rule as the reference point. That is to say, a set of available values of N may be preset, and the base station may indicate to the UE an index of a selected value of N in the set, so that the UE can know which reference point is selected by the base station based on the set and the index.

In some embodiments, the offset N is in unit of the number of the resource blocks. For example, one resource block or a preset number of resource blocks may serve as the unit. The preset number may be 2, 4, 7 or the like, and other values may also be possible. When multiple resource blocks serve as the unit, the number of bits occupied by the index S can be further reduced to further save signaling overhead.

For example, all the resource blocks are offset by N resource blocks relative to a specified resource block, and N may be 100 values of 0, 1, 2, ..., 98, 99, where the set of available values of N is {0, 10, 20, 30, ..., 80, 90}, and an index set corresponding to the set of available values is {0, 1, 2, 3, ..., 8, 9}. For example, when the frequency domain offset N is 3, the corresponding reference point is offset by 30 resource blocks relative to the specified resource block.

In the 5G system, a synchronization signal and a broadcast channel may be transmitted in the form of a synchronization signal block, and a Primary Synchronization Signal (PSS), a Secondary Synchronization Signal (SSS) and a Physical Broadcast Channel (PBCH) are in a Synchronization Signal Block (SS-Block). The 5G system introduces a function of beam sweeping, and each synchronization signal block can be regarded as a resource of one beam during the beam sweeping process. Multiple synchronization signal blocks constitute a synchronization signal burst (SS-burst) which can be considered as a piece of relatively concentrated resource that contains multiple beams. Multiple synchronization signal bursts constitute a synchronization signal burst set (SS-burst-set). The synchronization signal block is repeatedly transmitted on different beams, which is a process of beam sweeping. Through the training of beam sweeping, the UE can perceive on which beam a strongest signal is received.

In some embodiments, when types of the first type of resource block are different, the specified resource blocks are also different.

In some embodiments, when the first type of resource block belongs to a synchronization signal block, the specified resource block is a specified resource block in a synchronization signal or in a physical broadcast channel.

In some embodiments, when the specified resource block is a specified resource block in the synchronization signal block, the specified resource block may be one of the following resource blocks: a resource block with a minimum index in the synchronization signal; a resource block with a maximum index in the synchronization signal; or a resource block with any index between the minimum index and the maximum index in the synchronization signal.

In some embodiments, when the specified resource block is a specified resource block in the physical broadcast channel, the specified resource block may be one of the following resource blocks: a resource block with a minimum index in the physical broadcast channel; a resource block with a maximum index in the physical broadcast channel; or a resource block with any index between the minimum index and the maximum index in the physical broadcast channel.

In some embodiments, when the first type of resource block is a resource block in the CORESET, the specified resource block may be one of the following resource blocks: a resource block with a minimum index in the CORESET; a resource block with a maximum index in the CORESET; or a resource block with any index between the minimum index and the maximum index in the CORESET.

In some embodiments, which RB is selected as the specified resource block may be determined by the base station according to actual application scenarios, resource block designation conditions or adopted protocols. Any indexed resource block among the resource blocks in the synchronization signal block or the resource blocks in the CORESET can serve as the specified resource block, which may effectively improve resource allocation efficiency of the 5G system in the case of large bandwidth.

In some embodiments, when the first type of resource block belongs to a synchronization signal block, the reference point offset indication information may be acquired from the base station based on one of the following information: RMSI; an MIB; or Downlink Control Information (DCI).

In some embodiments, when the first type of resource block belongs to a CORESET, the reference point offset indication information may be acquired based on one of the following information: RMSI; or an MIB.

In 13, a frequency domain position of the reference point is calculated based on the position information of the first type of resource block and the reference point offset indication information.

In some embodiments, the UE calculates the frequency domain position of the reference point is calculated based on the position information of the first type of resource block and the reference point offset indication information.

In some embodiments, which resource block in the first type of resource block the specified resource block belongs to may be predetermined by the UE, or may be indicated to the UE by the base station through signaling.

In some embodiments, the UE may determine a position of the reference point based on a position of the specified resource block and the frequency domain offset N, and further calculate the frequency domain position of the reference point.

In 14, when scheduling information is received from the base station, a resource block for receiving a physical downlink shared channel is determined based on the frequency domain position of the reference point and resource allocation information included in the scheduling information.

In some embodiments, when the UE receives the scheduling information from the base station, the resource allocation information may be acquired from the scheduling information. The UE may determine, based on the frequency domain position of the reference point and the resource allocation information, the resource block for receiving the PDSCH.

In some embodiments, the resource block corresponding to the reference point is a start resource block. During the determination of the resource block for receiving the PDSCH, the resource block corresponding to the reference point is used as a base reference point for counting resource blocks, and the counting is started from there. The resource block for receiving the PDSCH is determined according to the resource allocation information included in the scheduling information.

In some embodiments, an index of the resource block corresponding to the reference point may be 0 or other values.

From above, the reference point offset indication information is acquired from the base station, where the reference point offset indication information includes the frequency domain offset N of the reference point relative to the specified resource block. The frequency domain position of the reference point is calculated based on the position information of the first type of resource block and the reference point offset indication information. In the 5G system, a system bandwidth of a single carrier is greatly increased. In the case of a large system bandwidth, based on the reference point and the resource allocation information included in the schedule information received from the base station, the UE can quickly determine the resource block for receiving the physical downlink shared channel, so that the resource allocation efficiency of the system in the idle state may be improved.

In some embodiments, the base station cannot obtain bandwidth capability of the UE in the idle state, and the maximum index for the resource block is a maximum index for the resource block under a minimum bandwidth.

In some embodiments, the minimum bandwidth is a smaller one between a system bandwidth and a minimum UE bandwidth. For example, the minimum UE bandwidth of 5 MHz may correspond to an index 24 of resource block.

In some embodiments, the minimum bandwidth and the corresponding maximum index for the resource block are related to a frequency band corresponding to a cell, such as a frequency range or a frequency band, and may be pre-defined by an adopted protocol.

Further, the first resource block may be a resource block in the CORESET. As the CORESET and the PDSCH use the same sub-band during transmission, the offset of the resource block for receiving the PDSCH relative to the reference point is relatively small, thereby saving signaling overhead.

Figure 2:
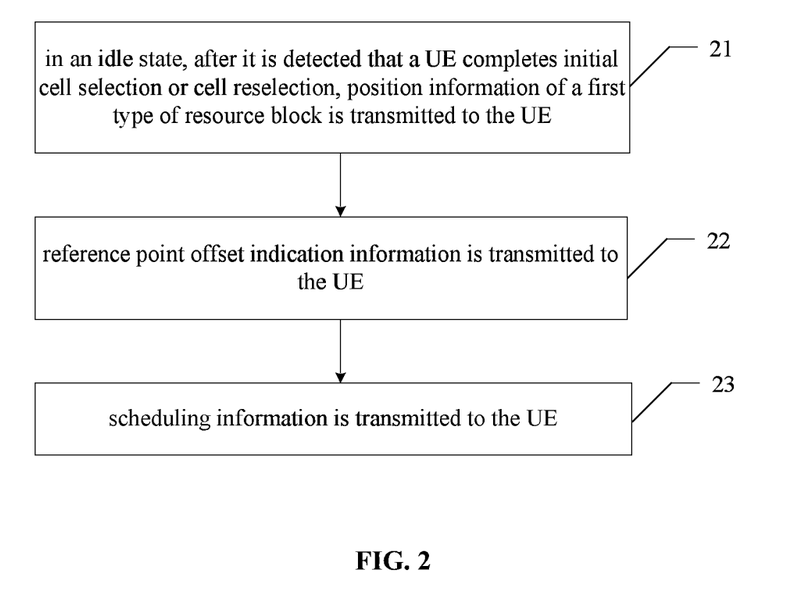
FIG. 2 schematically illustrates a flow chart of a method for allocating resources according to an embodiment.

FIG. 2 schematically illustrates a flow chart of a method for allocating resources according to an embodiment. Referring to FIG. 2, the method is applied for a base station to allocate resources for a UE, and includes 21, 22 and 23.

In 21, in an idle state, after it is detected that a UE completes initial cell selection or cell reselection, position information of a first type of resource block is transmitted to the UE.

In some embodiments, the first type of resource block belongs to a synchronization signal block or a CORESET.

In some embodiments, the first type of resource block belongs to a synchronization signal block. When the UE performs initial cell selection or cell reselection, position information of all resource blocks in the synchronization signal block is transmitted to the UE. After completing the initial cell selection or the cell reselection, the UE can acquire the position information of all the resource blocks in the synchronization signal block.

In some embodiments, if the first type of resource block belongs to a CORESET, the position information of the first type of resource block may be transmitted to the UE through RMSI, or through an MIB in a PBCH.

In some embodiments, in the idle state, the UE needs to monitor the PDCCH, and blindly detect its common search space to acquire DCI. The UE receives common control information, such as RMSI or paging messages, in the indicated PDSCH. In the idle state, the PDCCH that the UE needs to monitor is a common control channel which may use the timing of beams in the synchronization signal block, or may broadcast information by means of beam sweeping. Resources of the PDCCH constitute the CORESET.

The MIB carried by the base station in the PBCH may indicate that the UE needs to monitor a CORESET in the idle state, so that the UE can blindly detect the PDCCH in the CORESET in the idle state to acquire RMSI or the like, and the CORESET may be referred to as a first CORESET.

Another CORESET that the UE needs to monitor in the idle state may be indicated in the RMSI, so that the UE may blindly detect the PDCCH in the CORESET in the idle state to obtain a paging message or the like, and the CORESET may be referred to as a second CORESET.

In 22, reference point offset indication information is transmitted to the UE.

In some embodiments, the base station may transmit the reference point offset indication information to the UE, where the reference point offset indication information includes a frequency domain offset N of the reference point relative to a specified resource block, the specified resource block being one of the first type of resource block, and N being an integer.

In some embodiments, when the first type of resource block belongs to a synchronization signal block, the specified resource block may be a specified resource block in a synchronization signal or in a physical broadcast channel.

In some embodiments, when the specified resource block is a specified resource block in the synchronization signal block, the specified resource block may be one of the following resource blocks: a resource block with a minimum index in the synchronization signal; a resource block with a maximum index in the synchronization signal; or a resource block with any index between the minimum index and the maximum index in the synchronization signal.

In some embodiments, when the specified resource block is a specified resource block in the physical broadcast channel, the specified resource block may be one of the following resource blocks: a resource block with a minimum index in the physical broadcast channel; a resource block with a maximum index in the physical broadcast channel; or a resource block with any index between the minimum index and the maximum index in the physical broadcast channel.

In some embodiments, when the specified resource block is a resource block in the CORESET, the specified resource block may be one of the following resource blocks: a resource block with a minimum index in the CORESET; a resource block with a maximum index in the CORESET; or a resource block with any index between the minimum index and the maximum index in the CORESET.

In some embodiments, which RB is selected by the base station as the specified resource block may be determined according to actual application scenarios, resource block designation conditions or adopted protocols. Any indexed resource block among the resource blocks in the synchronization signal block or the resource blocks in the CORESET can serve as the specified resource block, which is relatively flexible and may effectively improve resource allocation efficiency of the 5G system in the case of a large bandwidth.

In some embodiments, when types of the first type of resource block are different, ways of the base station transmitting the reference point offset indication information to the UE are different accordingly.

In some embodiments, when the first type of resource block belongs to a synchronization signal block, the reference point offset indication information may be transmitted to the UE based on one of the following information: RMSI; an MIB in a PBCH; or DCI.

In some embodiments, when the first type of resource block belongs to a CORESET, the reference point offset indication information may be transmitted to the UE based on one of the following information: RMSI; or an MIB in a PBCH.

In some embodiments, the frequency domain offset N may be indicated by using a corresponding index S, where the number of bits of the index S is smaller than or equal to the number of bits of the frequency domain offset N.

In some embodiments, the base station may select one point from available reference points according to a predetermined rule as the reference point. That is to say, a set of available values of N may be preset by a protocol, and the base station may indicate to the UE an index of a selected value of N in the set, so that the UE can know which reference point is selected by the base station based on the set and the index, which may save bits occupied by the offset N and further save signaling overhead.

In some embodiments, after receiving the reference point offset indication information, the UE may calculate the frequency domain position of the reference point based on the position information of the first type of resource block and the reference point offset indication information.

In 23, scheduling information is transmitted to the UE.

In some embodiments, the scheduling information which includes resource allocation information may be transmitted to the UE, so that the UE determines a resource block for receiving a physical downlink shared channel based on the frequency domain position of the reference point and the resource allocation information included in the scheduling information.

By a PDCCH in a first CORESET or a second CORESET, the base station schedules the UE to receive PDSCH to acquire RMSI or paging messages. Scheduling information in the PDCCH includes resource allocation information, so as to inform the UE on which resource blocks to receive the PDSCH.

In some embodiments, the reference point corresponds to a start resource block, and the UE determines the resource block for receiving the physical downlink shared channel based on the resource allocation information included in the scheduling information by taking the start resource block corresponding to the reference point as a start resource block for counting resource blocks.

In some embodiments, an index of the resource block corresponding to the reference point may be 0 or other values.

From above, the base station transmits to the UE the position information of the first type of resource block and the reference point offset indication information, where the reference point offset indication information includes the frequency domain offset N of the reference point relative to the specified resource block. The UE may calculate the frequency domain position of the reference point based on the position information of the first type of resource block and the reference point offset indication information. In the 5G system, a system bandwidth of a single carrier is greatly increased. In the case of a large system bandwidth, based on the reference point and the resource allocation information included in the schedule information, the UE can quickly determine the resource block for receiving the physical downlink shared channel, so that the resource allocation efficiency of the system in the idle state may be improved.

In some embodiments, the base station cannot obtain bandwidth capability of the UE in the idle state, and the maximum index for the resource block is a maximum index for the resource block under a minimum bandwidth.

In some embodiments, the minimum bandwidth is a smaller one between a system bandwidth and a minimum UE bandwidth. For example, the minimum UE bandwidth of 5 MHz may correspond to an index 24 of resource block.

In some embodiments, the minimum bandwidth and the corresponding maximum index for the resource block are related to a frequency band corresponding to a cell, such as a frequency range or a frequency band, and may be predefined by an adopted protocol.

In some embodiments, more details of the method applied for the base station to allocate resources for the UE can be found in the above descriptions of the method for allocating resources as shown in FIG. 1.

To make those skilled in the art better understand and implement solutions of the present disclosure, embodiments of the present disclosure also provide a UE.

Figure 3:
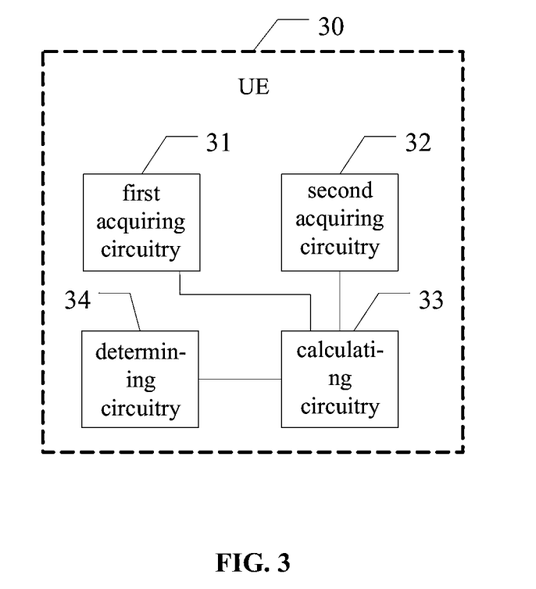
FIG. 3 schematically illustrates a structural diagram of a UE according to an embodiment.

FIG. 3 schematically illustrates a structural diagram of a UE according to an embodiment. Referring to FIG. 3, the UE 30 includes a first acquiring circuitry 31, a second acquiring circuitry 32, a calculating circuitry 33 and a determining circuitry 34.

The first acquiring circuitry 31 is configured to: after initial cell selection or cell reselection is completed in an idle state, acquire position information of a first type of resource block.

The second acquiring circuitry 32 is configured to acquire reference point offset indication information from a base station, wherein the reference point offset indication information includes a frequency domain offset N of a reference point relative to a specified resource block, the specified resource block being one of the first type of resource block, and N being an integer.

The calculating circuitry 33 is configured to calculate a frequency domain position of the reference point based on the position information of the first type of resource block and the reference point offset indication information.

The determining circuitry 34 is configured to: when scheduling information is received from the base station, determine a resource block for receiving a physical downlink shared channel based on the frequency domain position of the reference point and resource allocation information included in the scheduling information.

In some embodiments, the frequency domain offset N is indicated by a corresponding index S, and a bit number of the index S is smaller than or equal to a bit number of the frequency domain offset N.

In some embodiments, the reference point corresponds to a start resource block, and the determining circuitry 34 is configured to: determine the resource block for receiving the physical downlink shared channel based on the resource allocation information included in the scheduling information by taking the start resource block corresponding to the reference point as a start resource block for counting resource blocks.

In some embodiments, the first type of resource block belongs to a synchronization signal block or a control resource set.

In some embodiments, when the first type of resource block belongs to a synchronization signal block, the specified resource block is a specified resource block in a synchronization signal or in a physical broadcast channel.

In some embodiments, when the specified resource block is a specified resource block in the synchronization signal block, the specified resource block is one of the following resource blocks: a resource block with a minimum index in the synchronization signal; a resource block with a maximum index in the synchronization signal; or a resource block with any index between the minimum index and the maximum index in the synchronization signal.

In some embodiments, when the specified resource block is a specified resource block in the physical broadcast channel, the specified resource block is one of the following resource blocks: a resource block with a minimum index in the physical broadcast channel; a resource block with a maximum index in the physical broadcast channel; or a resource block with any index between the minimum index and the maximum index in the physical broadcast channel.

In some embodiments, the second acquiring circuitry 32 is configured to: when the first type of resource block belongs to a synchronization signal block, acquire the reference point offset indication information from the base station based on one of the following information: remaining minimum system information; a master information block in a physical broadcast channel; or downlink control information.

In some embodiments, the first acquiring circuitry 31 is configured to: when the first type of resource block belongs to a control resource set, acquire the position information of the first type of resource block based on one of the following information: remaining minimum system information; or a master information block in a physical broadcast channel.

In some embodiments, the second acquiring circuitry 32 is configured to: when the first type of resource block belongs to a control resource set, acquire the reference point offset indication information from the base station based on one of the following information: remaining minimum system information; or a master information block in a physical broadcast channel.

In some embodiments, when the specified resource block is a resource block in the control resource set, the specified resource block is one of the following resource blocks: a resource block with a minimum index in the control resource set; a resource block with a maximum index in the control resource set; or a resource block with any index between the minimum index and the maximum index in the control resource set.

As the base station cannot obtain bandwidth capability of the UE in the idle state, in some embodiments, the maximum index for the resource block may be a maximum index for the resource block under a minimum bandwidth.

In some embodiments, the minimum bandwidth is a smaller one between a system bandwidth and a minimum user equipment bandwidth. For example, the minimum UE bandwidth of 5 MHz may correspond to an index 24 of resource block.

In some embodiments, the minimum bandwidth and the corresponding maximum index for the resource block are related to a frequency band corresponding to a cell, such as a frequency range or a frequency band, and may be predefined by an adopted protocol.

Figure 4:
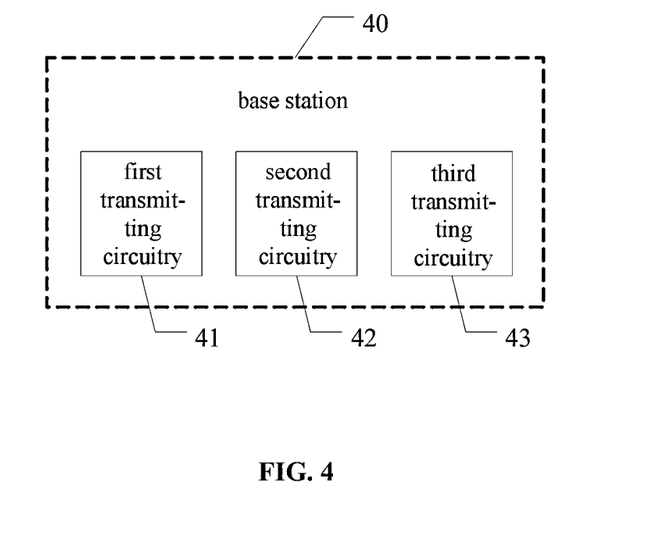
FIG. 4 schematically illustrates a structural diagram of a base station according to an embodiment.

Embodiments of the present disclosure further provide a base station. FIG. 4 schematically illustrates a structural diagram of a base station according to an embodiment. Referring to FIG. 4, the base station 40 includes a first transmitting circuitry 41, a second transmitting circuitry 42 and a third transmitting circuitry 43.

The first transmitting circuitry 41 is configured to: in an idle state, after it is detected that a UE completes initial cell selection or cell reselection, transmit to the UE position information of a first type of resource block.

The second transmitting circuitry 42 is configured to transmit to the UE reference point offset indication information, so that the UE calculates a frequency domain position of a reference point based on the position information of the first type of resource block and the reference point offset indication information, wherein the reference point offset indication information includes a frequency domain offset N of the reference point relative to a specified resource block, the specified resource block being one of the first type of resource block, and N being an integer.

The third transmitting circuitry 43 is configured to transmit to the UE scheduling information which includes resource allocation information, so that the UE determines a resource block for receiving a physical downlink shared channel based on the frequency domain position of the reference point and the resource allocation information included in the scheduling information.

In some embodiments, the frequency domain offset N is indicated by a corresponding index S, and a bit number of the index S is smaller than or equal to a bit number of the frequency domain offset N.

In some embodiments, the second transmitting circuitry 42 includes a selecting sub-circuitry configured to select one point from available reference points according to a predetermined rule as the reference point.

In some embodiments, the reference point corresponds to a start resource block which is taken as a start resource block for counting resource blocks when the UE determines the resource block for receiving the physical downlink shared channel based on the resource allocation information included in the scheduling information.

In some embodiments, the first type of resource block belongs to a synchronization signal block or a control resource set.

In some embodiments, when the first type of resource block belongs to a synchronization signal block, the specified resource block is a specified resource block in a synchronization signal or in a physical broadcast channel.

In some embodiments, when the specified resource block is a specified resource block in the synchronization signal block, the specified resource block is one of the following resource blocks: a resource block with a minimum index in the synchronization signal; a resource block with a maximum index in the synchronization signal; or a resource block with any index between the minimum index and the maximum index in the synchronization signal.

In some embodiments, when the specified resource block is a specified resource block in the physical broadcast channel, the specified resource block is one of the following resource blocks: a resource block with a minimum index in the physical broadcast channel; a resource block with a maximum index in the physical broadcast channel; or a resource block with any index between the minimum index and the maximum index in the physical broadcast channel.

In some embodiments, the second transmitting circuitry 42 is configured to: when the first type of resource block belongs to a synchronization signal block, transmit to the UE the reference point offset indication information based on one of the following information: remaining minimum system information; a master information block in a physical broadcast channel; or downlink control information.

In some embodiments, the first transmitting circuitry 41 is configured to: when the first type of resource block belongs to a control resource set, transmit to the UE the position information of the first type of resource block based on one of the following information: remaining minimum system information; or a master information block in a physical broadcast channel.

In some embodiments, the second transmitting circuitry 42 is configured to: when the first type of resource block belongs to a control resource set, transmit to the UE the reference point offset indication information based on one of the following information: remaining minimum system information; or a master information block in a physical broadcast channel.

In some embodiments, when the specified resource block is a resource block in the control resource set, the specified resource block is one of the following resource blocks: a resource block with a minimum index in the control resource set; a resource block with a maximum index in the control resource set; or a resource block with any index between the minimum index and the maximum index in the control resource set.

In some embodiments, the maximum index for the resource block is a maximum index for the resource block under a minimum bandwidth.

In some embodiments, the minimum bandwidth is a smaller one between a system bandwidth and a minimum user equipment bandwidth. For example, the minimum UE bandwidth of 5 MHz may correspond to an index 24 of resource block.

In some embodiments, the minimum bandwidth and the corresponding maximum index for the resource block are related to a frequency band corresponding to a cell, such as a frequency range or a frequency band, and may be pre-defined by an adopted protocol.

In an embodiment of the present disclosure, a computer readable storage medium which is applied in a UE and has computer instructions stored therein is provided, wherein once the computer instructions are executed, the above method for allocating resources as shown in FIG. 1 is performed.

In an embodiment of the present disclosure, a computer readable storage medium which is applied in a base station and has computer instructions stored therein is provided, wherein once the computer instructions are executed, the method for allocating resources as shown in FIG. 2 is performed.

In an embodiment of the present disclosure, a UE is provided, including a memory and a processor, wherein the memory has computer instructions stored therein, and once executing the computer instructions, the processor performs any one of the above methods for allocating resources which are applied in the UE.

In an embodiment of the present disclosure, a base station is provided, including a memory and a processor, wherein the memory has computer instructions stored therein, and once executing the computer instructions, the processor performs any one of the above methods for allocating resources which are applied in the base station for allocating resources to a UE.

It should be noted that, PDCCH, PDSCH, CORESET, RMSI, MIB and so on in the embodiment of the present disclosure are corresponding channels and signals in a 5 G system. With the development of technology, other names may be used in protocols in the future. No matter whether names change or not, corresponding channels and signals having the same functions with PDCCH, PDSCH, CORE-SET, RMSI, MIB and so on should fall in the scope of the embodiments of the present disclosure.

Those skilled in the art can understand that all of or a portion of the processes in the method provided in the above embodiments can be implemented by related hardware with instruction of computer program. The computer program may be stored in a readable storage medium, such as a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for allocating resources, comprising:
   acquiring position information of a first type of resource block;
   acquiring reference point offset indication information according to a Master Information Block (MIB) in a Physical Broadcast Channel (PBCH), wherein the reference point offset indication information comprises a frequency domain offset N of a reference point relative to a specified resource block, the specified resource block being one of the first type of resource block, and N being an integer;
   calculating a frequency domain position of the reference point according to the position information of the first type of resource block and the reference point offset indication information;
   acquiring information of a first Control Resource Set (CORESET) according to the frequency domain position of the reference point, and monitoring the first CORESET;
   when receiving scheduling information, determining a resource block for receiving a Physical Downlink Shared Channel (PDSCH) and acquiring Remaining Minimum System Information (RMSI) according to the frequency domain position of the reference point and resource allocation information included in the scheduling information; and
   acquiring information of a second CORESET according to the RMSI, and monitoring the second CORESET.

2. The method according to claim 1, wherein the reference point corresponds to a start resource block, and determining a resource block for receiving a physical downlink shared channel according to the frequency domain position of the reference point and resource allocation information included in the scheduling information comprises:
   determining the resource block for receiving the physical downlink shared channel according to the resource allocation information included in the scheduling information by taking the start resource block corresponding to the reference point as a start resource block for counting resource blocks.

3. The method according to claim 1, wherein the first type of resource block belongs to a synchronization signal block.

4. The method according to claim 3, wherein the specified resource block is a specified resource block in a synchronization signal or in the PBCH.

5. The method according to claim 4, wherein when the specified resource block is the specified resource block in the synchronization signal, the specified resource block is one of the following resource blocks:
   a resource block with a minimum index in the synchronization signal;

a resource block with a maximum index in the synchronization signal; or a resource block with any index between the minimum index and the maximum index in the synchronization signal.

6. The method according to claim 4, wherein when the specified resource block is the specified resource block in the PBCH, the specified resource block is one of the following resource blocks:

a resource block with a minimum index in the PBCH;

a resource block with a maximum index in the PBCH; or a resource block with any index between the minimum index and the maximum index in the PBCH.

7. The method according to claim 1, wherein the maximum index for the resource block is a maximum index for the resource block under a minimum bandwidth.

8. The method according to claim 7, wherein the minimum bandwidth is a smaller one between a system bandwidth and a minimum user equipment bandwidth.

9. A method for allocating resources, comprising:

transmitting to a User Equipment (UE) position information of a first type of resource block;

transmitting to the UE reference point offset indication information via a Master Information Block (MIB) in a Physical Broadcast Channel (PBCH), so that the UE calculates a frequency domain position of a reference point according to the position information of the first type of resource block and the reference point offset indication information, acquires information of a first Control Resource Set (CORESET) according to the frequency domain position of the reference point, and monitors the first CORESET, wherein the reference point offset indication information comprises a frequency domain offset N of the reference point relative to a specified resource block, the specified resource block being one of the first type of resource block, and N being an integer; and transmitting to the UE scheduling information which comprises resource allocation information, so that the UE determines a resource block for receiving a Physical Downlink Shared Channel (PDSCH) and acquires Remaining Minimum System Information (RMSI) according to the frequency domain position of the reference point and the resource allocation information included in the scheduling information, acquires information of a second CORESET according to the RMSI, and monitors the second CORESET.

10. The method according to claim 9, wherein the reference point corresponds to a start resource block, and determining a resource block for receiving a physical downlink shared channel according to the frequency domain position of the reference point and resource allocation information included in the scheduling information comprises:

determining the resource block for receiving the physical downlink shared channel according to the resource allocation information included in the scheduling information by taking the start resource block corresponding to the reference point as a start resource block for counting resource blocks.

11. The method according to claim 9, wherein the first type of resource block belongs to a synchronization signal block.

12. The method according to claim 11, wherein the specified resource block is a specified resource block in a synchronization signal or in the PBCH.

13. The method according to claim 12, wherein when the specified resource block is the specified resource block in the synchronization signal, the specified resource block is one of the following resource blocks:

a resource block with a minimum index in the synchronization signal;

a resource block with a maximum index in the synchronization signal; or a resource block with any index between the minimum index and the maximum index in the synchronization signal.

14. The method according to claim 12, wherein when the specified resource block is the specified resource block in the PBCH, the specified resource block is one of the following resource blocks:

a resource block with a minimum index in the PBCH;

a resource block with a maximum index in the PBCH; or a resource block with any index between the minimum index and the maximum index in the PBCH.

15. The method according to claim 9, wherein the maximum index for the resource block is a maximum index for the resource block under a minimum bandwidth.

16. The method according to claim 15, wherein the minimum bandwidth is a smaller one between a system bandwidth and a minimum UE bandwidth.

17. A computer readable storage medium which is applied in a User Equipment (UE) and has computer instructions stored therein, wherein once the computer instructions are executed, the method according to claim 1 is performed.

18. A computer readable storage medium which is applied in a base station and has computer instructions stored therein, wherein once the computer instructions are executed, the method according to claim 9 is performed.

19. A User Equipment (UE) comprising a memory and a processor, wherein the memory has computer instructions stored therein, and when the processor executes the computer instructions, the method of claim 1 is performed.

20. A base station comprising a memory and a processor, wherein the memory has computer instructions stored therein, and when the processor executes the computer instructions, the method of claim 9 is performed.

* * * * *